(12) United States Patent  
Elie et al.

(10) Patent No.: US 10,173,647 B2  
(45) Date of Patent: Jan. 8, 2019

(54) SYSTEMS AND METHODS FOR EFFICIENT AUTOMATIC VEHICLE WASHING

(71) Applicant: Ford Global Technologies, LLC, Dearborn, MI (US)

(72) Inventors: Larry Dean Elie, Ypsilanti, MI (US); Robert F. Novak, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 15/079,619

(22) Filed: Mar. 24, 2016

(65) Prior Publication Data

US 2017/0274874 A1 Sep. 28, 2017

(51) Int. Cl.
*B60S 3/06* (2006.01)
*B08B 3/02* (2006.01)
*B08B 5/04* (2006.01)
*A47L 9/00* (2006.01)
*B08B 1/00* (2006.01)
(Continued)

(52) U.S. Cl.
CPC ............... *B60S 3/06* (2013.01); *A47L 9/009* (2013.01); *B08B 1/00* (2013.01); *B08B 3/024* (2013.01); *B08B 5/04* (2013.01); *B60S 3/04* (2013.01); *G05D 1/00* (2013.01)

(58) Field of Classification Search
CPC ..... B60S 3/06; B60S 3/04; B08B 1/00; B08B 3/024; B08B 5/04; A47L 9/009; A47L 2201/00; G05D 1/00
See application file for complete search history.

(56) References Cited

U.S. PATENT DOCUMENTS

| 7,811,385 | B2 | 10/2010 | Auer et al. |
| 8,437,875 | B2 | 5/2013 | Hernandez |
| 2008/0229531 | A1 | 9/2008 | Takida |

(Continued)

FOREIGN PATENT DOCUMENTS

| CN | 205524162 U | 8/1916 |
| CN | 106515675 A | 3/1917 |

(Continued)

OTHER PUBLICATIONS https://www.youtube.com/watch?v=Nleclfggn_U titled Pelican Imaging Array Camera Captures 3D Video by Pelican Imaging dated Jun. 12, 2013.

(Continued)

*Primary Examiner* — David Redding
(74) *Attorney, Agent, or Firm* — James P. Muraff; Neal, Gerber & Eisenberg, LLP

(57) ABSTRACT

Systems and methods are provided for automatically cleaning the exterior surfaces of a vehicle. The systems can include a motorized robot, cleaning element, and camera all communicatively linked to a processor. The processor can receive CAD information regarding the shape and size of the exterior surfaces of the vehicle to be cleaned along with information regarding the position of the motorized robot on the vehicle. The processor can then determine an efficient path for the motorized robot to travel across the vehicle surfaces. Along the course of its travel, the motorized robot can employ the cleaning element to remove dirt or other debris from the vehicle surface.

19 Claims, 2 Drawing Sheets

(51) Int. Cl.
*B60S 3/04* (2006.01)
*G05D 1/00* (2006.01)

(56) References Cited

U.S. PATENT DOCUMENTS

| | | |
|---|---|---|
| 2011/0126857 A1 | 6/2011 | Kaipainen |
| 2017/0121019 A1 | 5/2017 | Shin et al. |
| 2017/0151934 A1* | 6/2017 | Almalki .................. B60S 3/04 |

FOREIGN PATENT DOCUMENTS

| | | |
|---|---|---|
| CN | 1030732555 B | 5/2015 |
| EP | 1806265 B1 | 10/2008 |
| JP | 3802195 B2 | 7/2006 |

OTHER PUBLICATIONS

Search Report dated Aug. 22, 2017 for GB Patent Application No. GB 1704317.5 (3 pages).

\* cited by examiner

SYSTEMS AND METHODS FOR EFFICIENT AUTOMATIC VEHICLE WASHING

TECHNICAL FIELD

The following disclosure relates to systems and methods for automatically cleaning the exterior surfaces of a vehicle in an efficient manner utilizing less resources than traditional cleaning methods.

BACKGROUND OF THE INVENTION

All vehicles get dirty over time. Presently, there are systems that attempt to keep dust and dirt off of vehicle exteriors through static charge but they are not consistently successful and operate very inefficiently. Moreover, traditional methods of cleaning vehicles such as car-washes use a great deal of water and energy, human labor, or both. In addition, these traditional methods often lead to abrasion of the vehicle's paint or clear coat surfaces over time and can result in problems in areas near the vehicle's trim and antennas. Accordingly, there is a need for a system to automatically clean the exterior of a vehicle in a manner that uses less resources and energy than traditional approaches and is careful to not cause damage to any of the vehicle surfaces or components.

SUMMARY OF THE INVENTION

Systems and methods are provided for automatically cleaning the exterior surfaces of a vehicle. The systems can include a motorized robot, cleaning element, and camera all communicatively linked to a processor. The processor can receive CAD information regarding the shape and size of the exterior surfaces of the vehicle to be cleaned along with information regarding the position of the motorized robot on the vehicle. The processor can then determine an efficient path for the motorized robot to travel across the vehicle surfaces. Along the course of its travel, the motorized robot can employ the cleaning element to remove dirt or other debris from the vehicle surface. The camera can observe the surface of the vehicle at or near the robot's position and detect any foreign objects or other obstacles that might impede the robot's movement and notify the processor of the location of those objects. Alternative embodiments may include a robotic arm integrated into a base station attached to the vehicle in lieu of the motorized robot.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS OF THE INVENTION

Figure 1:
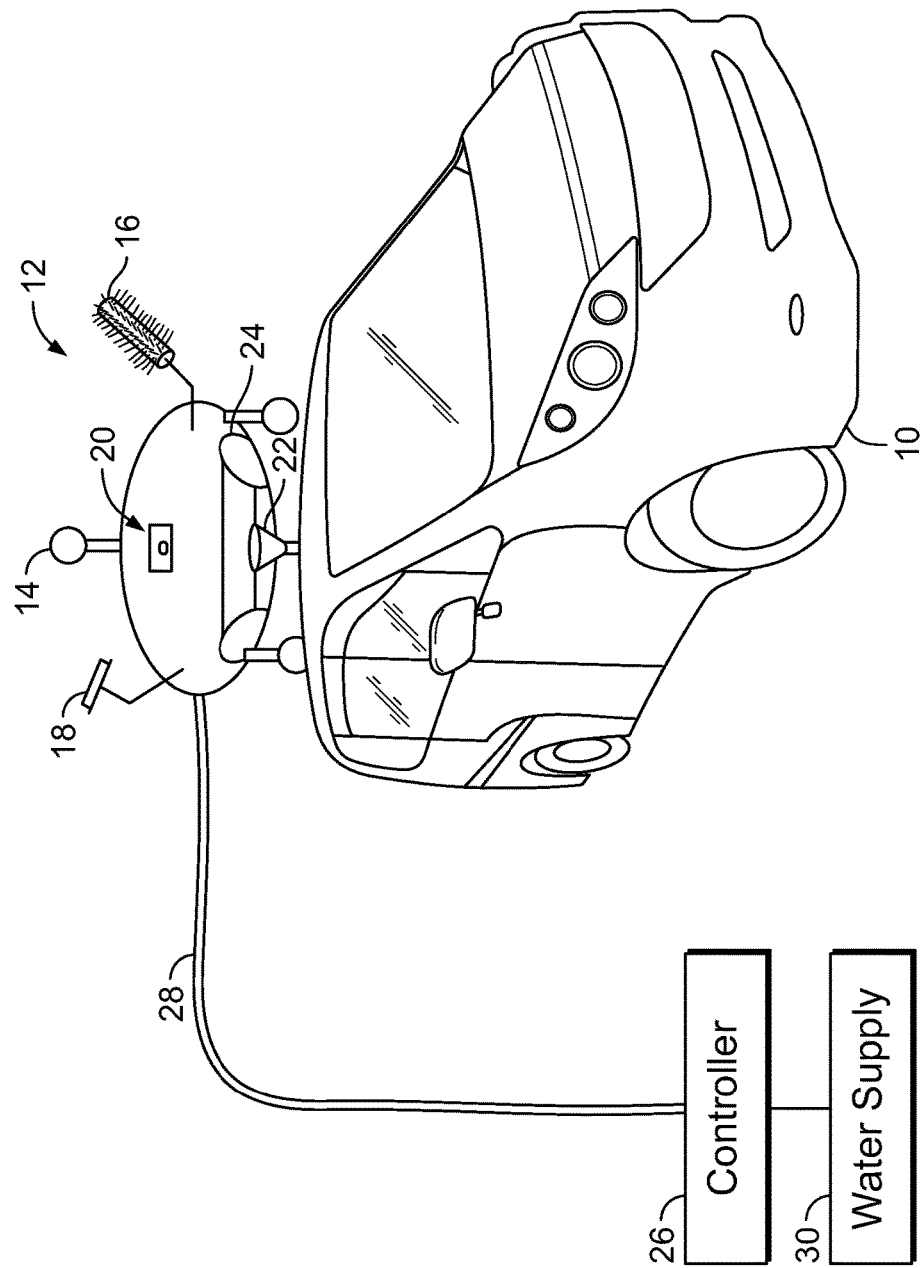
FIG. 1 is a diagram illustrating the various components of an exemplary embodiment of a system in accordance with the invention.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with the invention. A vehicle 10 using the embodiment system is shown. A motorized robot 12 having a plurality of moveable feet 14 is equipped with a rotary brush 16, a squeegee 18, a camera 20, a cleaning fluid outlet 22, and a vacuum 24. The moveable feet 14 are equipped with a material or system that enable them to temporarily adhere to the surfaces of the vehicle and thus enable the robot 12 to be able to travel across all exterior vehicle surfaces. For example, the moveable feet 14 may be equipped with suction cups or magnets. In addition, a material that simulates the sticky pads on the ends of gecko feet may also be employed. Those of ordinary skill in the art will understand there are many other types of adhesion systems and materials that may be employed without departing from the novel scope of the present invention.

The rotary brush 16 and/or the squeegee 18 can be engaged by the robot 12 against the surfaces of the vehicle 10 as the robot 12 moves across them to remove dirt, dust, or other debris that may be present. These cleaning elements may also be used interchangeably as the system determines the robot 12 is traveling over different types of surfaces. For example, the system may use the squeegee 18 for the windshield and window surfaces but employ the rotary brush 16 for all painted surfaces. Those of ordinary skill in the art will understand there are a variety of other cleaning elements that might be employed by the system without departing from the novel scope of the present invention. For example, an embodiment of the present invention may employ a squeegee 18 along with a heating element or a steam source to melt or remove snow, ice, and/or frost from one or more vehicle surfaces. As the robot 12 moves across the vehicle 10, it can also dispense a cleaning fluid to aid the cleaning elements through the cleaning fluid outlet 22. In this exemplary embodiment the cleaning fluid is water. However, a variety of other cleaning fluids could be used ranging from organic and inorganic solvents, steam, and even air.

The robot 12 is also equipped with a vacuum 24. The vacuum 24 can be used to remove any cleaning fluid from the surface of the vehicle 10. The fluid can be collected in a reservoir inside the robot 12 where it can be filtered and then reused by the robot 12. When the robot is not in use, the filter can then be reverse rinsed by the system to ensure the robot 12 stays clean for future uses.

Finally, the robot 12 has a camera 20 integrated. The camera 20 can be a small light-field or stereoscopic camera or any other camera capable of perceiving and measuring depth. The camera 20 can be used to detect the presence and location of unexpected or foreign objects on the surface of the vehicle 10. The camera 20 can also be used to detect the exact color or cleanliness level of the vehicle surface and/or the presence of any surface damage or corrosion such as rust.

The motorized robot 12 of the present embodiment is communicatively connected to a controller 26 via a tether 28. The controller 26 and tether 28 are also connected to a water supply 30. The tether 28 is comprised primarily of wires to establish a communications link between the controller 26 and robot 12 and a tube or hose connecting the water supply 30 to the robot 12. Additionally, the controller 26 could be integrated into the robot 12 itself or communicate with the robot wirelessly.

The controller 26 is configured to access and receive CAD drawing information regarding the vehicle 10 such that the controller 26 can determine the precise dimensions of the vehicle surfaces that the robot 12 needs to traverse. The controller 26 also receives real-time data indicating the position of the robot 12 on the vehicle 10. Using these two sets of data, the controller 26 determines the most efficient cleaning program for the robot 12 to follow and instructs the robot 12 to execute that program. The program elements may include the speed, shape, and angle of the robot's 12 movement across the surfaces of the vehicle 10, where and when to engage various cleaning elements such as the rotary brush 16 or squeegee 18, when to dispense cleaning fluid, how much cleaning fluid to dispense, and when to activate the vacuum 24. Those of ordinary skill in the art will understand there are various other parameters that might be including in the cleaning program without departing from the novel scope of the present invention.

During the execution of the vehicle cleaning program, the camera 20 monitors the surface of the vehicle 10 at and/or near the current position of the robot 12. In the event that the camera detects an object or other variation of the vehicle surface that is inconsistent with the dimensions set forth in the vehicle's 10 CAD drawings, the camera 20 alerts the controller 26. The controller 26 can then appropriately modify the vehicle cleaning program and instruct the robot 12 accordingly. A similar protocol can also be followed in the event the camera 20 detects surface corrosion or damage or that the color of the surface is not as expected thus indicating that further cleaning by the robot 12 may be necessary.

Figure 2:
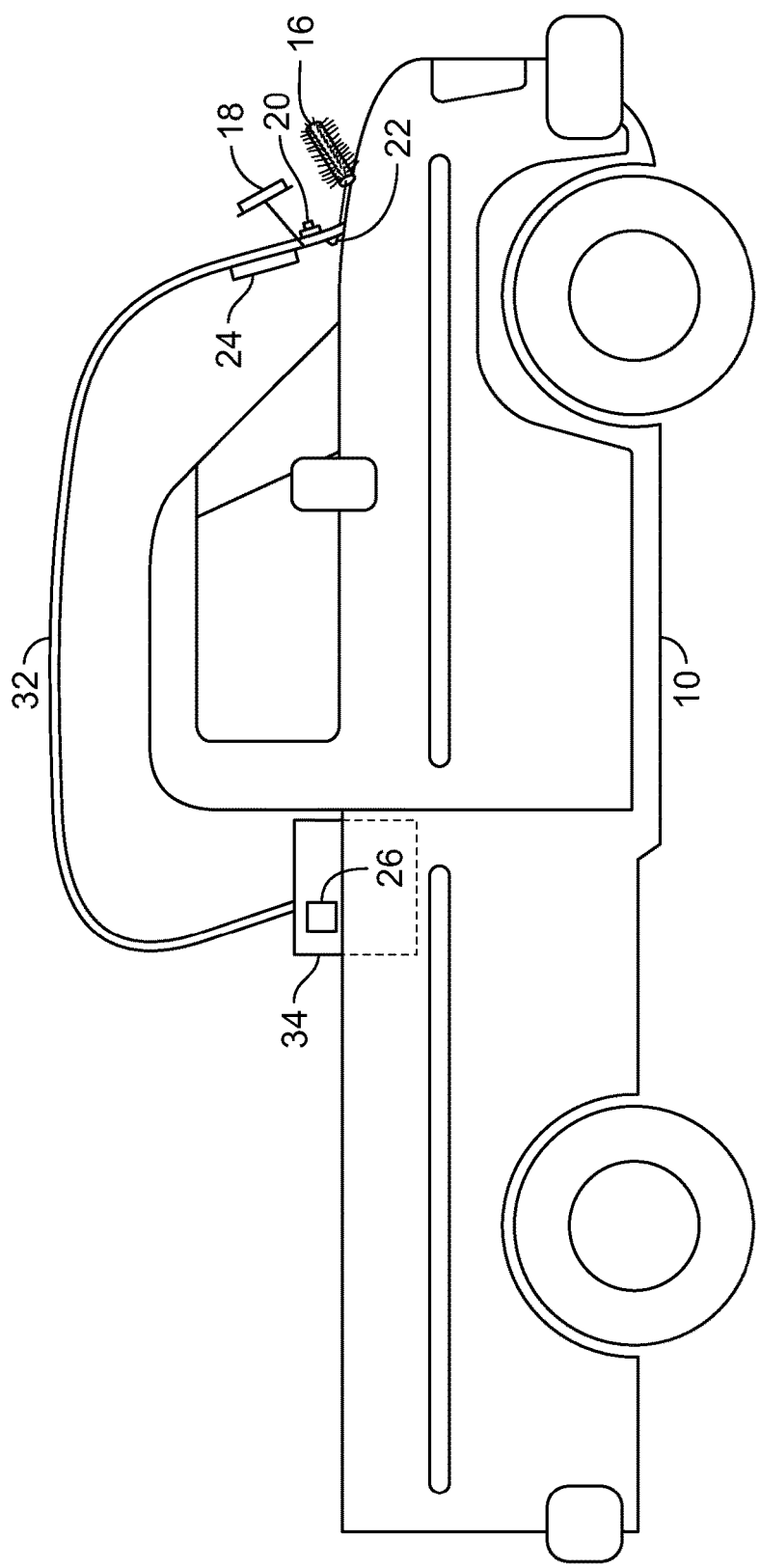
FIG. 2 is a diagram illustrating the various components of an alternative embodiment of a system in accordance with the invention.

FIG. 2 shows an alternative embodiment of the present invention. In this embodiment, a base unit 34 is attached to or integrated with vehicle 10. The base unit 34 houses a robotic arm 32 comprising a rotary brush 16, a squeegee 18, a camera 20, a cleaning fluid outlet 22, and a vacuum 24. Each of these components functions in a substantially similar fashion to the corresponding components described in the embodiment depicted in FIG. 1. The base unit 34 also houses a cleaning fluid reservoir and a controller 26 in communication with the robotic arm 32.

The controller 26 is configured to access and receive CAD drawing information regarding the vehicle 10 such that the controller 26 can determine the precise dimensions of the vehicle surfaces that the robotic arm 32 needs to make contact with. The controller 26 also receives real-time data indicating the position of the robotic arm 32. Using these two sets of data, the controller 26 determines the most efficient cleaning program for the robotic arm 32 to follow and instructs the robotic arm 32 to execute that program. The program elements may include the speed, shape, and angle of the robotic arm's 32 movement, where and when to engage various cleaning elements such as the rotary brush 16 or squeegee 18, when to dispense cleaning fluid, how much cleaning fluid to dispense, and when to activate the vacuum 24. Those of ordinary skill in the art will understand there are various other parameters that might be including in the cleaning program without departing from the novel scope of the present invention.

During the execution of the vehicle cleaning program, the camera 20 monitors the surface of the vehicle 10 at and/or near the current position of the robotic arm 32. In the event that the camera detects an object or other variation of the vehicle surface that is inconsistent with the dimensions set forth in the vehicle's 10 CAD drawings, the camera 20 alerts the controller 26. The controller 26 can then appropriately modify the vehicle cleaning program and instruct the robotic arm 32 accordingly. A similar protocol can also be followed in the event the camera 20 detects surface corrosion or damage or that the color of the surface is not as expected thus indicating that further cleaning by the robotic arm 32 may be necessary.

It should be understood that the invention is not be limited to any single embodiment and should only be construed in breadth and scope in accordance with recitation of the appended claims.

We claim:

1. A system for cleaning an exterior of a vehicle comprising:
   a motorized robot configured to move across the exterior surfaces of the vehicle;
   a cleaning element attached to the motorized robot;
   a controller configured to receive at least one CAD drawing of exterior surfaces of the vehicle and data regarding a position of the motorized robot and determine, based on the received data, where the motorized robot should move on the vehicle exterior surfaces and
   a tether connecting the controller and the motorized robot and enabling communications between them.

2. The system of claim 1 wherein the motorized robot comprises a material that enables the motorized robot to temporarily adhere to the exterior surfaces of the vehicle.

3. The system of claim 2 wherein the material is a suction cup or a magnet.

4. The system of claim 1 wherein the cleaning element is a rotary brush.

5. The system of claim 1 wherein the cleaning element is a squeegee.

6. A system comprising:
   a motorized robot configured to move across exterior surfaces of a vehicle;
   a vacuum integrated into the motorized robot;
   a cleaning element attached to the motorized robot; and
   a controller configured to receive at least one CAD drawing of the exterior surfaces of the vehicle and data regarding a position of the motorized robot and determine, based on the received data, where the motorized robot should move on the vehicle exterior surfaces.

7. The system of claim 1 further comprising a cleaning fluid outlet integrated into the motorized robot.

8. The system of claim 1 further comprising a camera attached to the motorized robot and configured to view the exterior surfaces of the vehicle.

9. The system of claim 8 wherein the camera is a light-field or stereoscopic camera.

10. The system of claim 8 wherein the camera is further configured to detect a location of damage or foreign objects present on the exterior surfaces of the vehicle and notify the controller of those locations.

11. The system of claim 6 further comprising a tether connecting the controller and the motorized robot and enabling communications between them.

12. The system of claim 1 wherein the tether is further configured to conduct cleaning fluid from a source to the motorized robot.

13. A system for cleaning an exterior of a vehicle comprising:
   a robotic arm integrated into a base unit attached to the vehicle;
   a vacuum integrated into the robotic arm;
   a cleaning element attached to the robotic arm; and
   a controller configured to receive at least one CAD drawing of the exterior surfaces of the vehicle and data regarding the position of the robotic arm and determine, based on the received data, where the robotic arm should move to enable the cleaning element to clean the exterior surfaces of the vehicle.

14. The system of claim 13 wherein the cleaning element is a rotary brush.

15. The system of claim 13 wherein the cleaning element is a squeegee.

16. The system of claim 13 further comprising a cleaning fluid outlet integrated into the robotic arm.

17. The system of claim 13 wherein the base unit comprises a cleaning fluid reservoir for supplying cleaning fluid to the robotic arm.

18. The system of claim 13 further comprising a camera attached to the robotic arm and configured to view the exterior surfaces of the vehicle.

19. The system of claim 18 wherein the camera is further configured to detect a location of damage or foreign objects present on the exterior surfaces of the vehicle and notify the controller of those locations.

* * * * *